United States Patent
Schulz

(10) Patent No.: US 6,567,130 B1
(45) Date of Patent: May 20, 2003

(54) METHOD AND APPARATUS FOR CAPTURING VIDEO FILES FOR USE IN HDTV BROADCAST AND DEMONSTRATION

(75) Inventor: Rod A. Schulz, Sioux Falls, SD (US)

(73) Assignee: Sencore, Inc., Sioux Falls, SD (US)

( * ) Notice: Subject to any disclaimer, the term of this patent is extended or adjusted under 35 U.S.C. 154(b) by 0 days.

(21) Appl. No.: 09/538,835

(22) Filed: Mar. 30, 2000

(51) Int. Cl.[7] ................................. H04N 9/64
(52) U.S. Cl. ..................... 348/714; 348/718; 348/719
(58) Field of Search .................. 348/714, 715, 348/716, 718, 719; 345/558; H04N 9/64

(56) References Cited

U.S. PATENT DOCUMENTS 5,047,760 A * 9/1991 Trevett et al. ............. 345/558
5,500,939 A * 3/1996 Kurihara .................. 345/558

* cited by examiner

Primary Examiner—Sherrie Hsia
(74) Attorney, Agent, or Firm—Patnaude & Videbeck

(57) ABSTRACT

A method and apparatus are disclosed for capturing and storing digital high definition television signals. The signals are taken from an input device in 8-bit parallel fashion at a constant flow rate and put into each of four 8-bit first in-first out memory registers until they are half full. After the respective first in-first out memory registers are half filled, additional quantities of data equal to half filling the registers are added while the data from the first half register filling is presented to the system memory as 32 bit words. That data is filled into a first of two concurrent blocks of system memory and after the first block is filled, while the second block is filled, the data is written from the first of the two concurrent blocks into another part of the system memory. The transfer of the 32-bit data words is accomplished at a faster rate than the input rate of the 8-bit data.

11 Claims, 2 Drawing Sheets

METHOD AND APPARATUS FOR CAPTURING VIDEO FILES FOR USE IN HDTV BROADCAST AND DEMONSTRATION

This invention relates to apparatus and methods for capturing video files that are required for use in HDTV (high definition television) broadcast and demonstration and, more particularly, to methods and apparatus for capturing MPEG (motion pictures experts group) video files.

BACKGROUND OF THE INVENTION

The change in commercial electronics from analog electronic circuitry to digital electronic circuitry has already brought about and will continue to bring about vast changes in electronic products offered to consumers. While this change has already been seen in the personal computer industry and the digital wireless telephone industry, this trend has now reached the video industry as well. The development of fast, large-capacity disc storage devices and advanced video compression algorithms has allowed the video market to join the digital revolution.

One of the large capacity storage devices now available to the public is the DVD (digital versatile disk). The DVD is one way that compression algorithms have allowed the spacial and temporal redundancy inherent in a moving picture to be reduced to the point where the video information from the moving picture can fit on a disk comparable to an audio compact disk, all the while maintaining a picture quality far beyond the capability of VHS tape. This improved picture quality is necessary for use on larger viewing screens, and as high density television becomes the standard for consumer video entertainment in the relatively near future, the availability of digital video files promises improvements in resolution and viewing aspects that will greatly improve the picture quality on these larger viewing screens. Since HDTV will become standard, the manufacturers of these new televisions are starting to produce and market those products. At present MPEG video files are becoming more readily available and commonplace. As such, the users of the demonstrators and receivers necessary to commercially sell these HDTV products need a means for capturing these MPEG-2 video files and the data they contain for later use.

A need has arisen for an apparatus and method for capturing MPEG-2 files onto a personal computer hard drive memory in a condition in which they may be utilized in the future for viewing on an HDTV.

It is, therefore, an object of the present invention, generally stated, to provide a method and apparatus for capturing video files and the data therein for later use. More particularly, it is a further object of the present invention to provide a method and apparatus for capturing MPEG video files required for HDTV broadcast and demonstration.

SUMMARY OF THE INVENTION

The invention resides in a method of capturing and storing digital HDTV signals that comprises the following steps: filling each of the first in-first out registers with data in an 8-bit per device sequential fashion at a constant flow rate until they are half full; transferring the data to system memory as 32-bit words; filling each of the first in-first out registers with the data in an 8-bit per device sequential fashion in a constant flow rate in a quantity equal to half filling said first in-first out registers; transferring the data to system memory as 32-bit words; filling a first of two concurrent blocks of system memory with the data presented to the system memory; filling a second of two concurrent blocks of system memory with the data presented to the system memory; writing the data from the first of two concurrent blocks of system memory to the hard drive as the second of two concurrent blocks of system memory is filling; writing the data from the second of two concurrent blocks of system memory to the hard drive as the first of two concurrent blocks is filling; and the transfer of the 32-bit words being accomplished at a faster rate than the input of the 8-bit data.

The invention further resides in a data capturing and storage apparatus for storing 32-bit HDTV video data wherein the apparatus comprises a central processing unit. System memory in communication with the central processing unit includes at least first and second distinct blocks of memory. Four first in-first out registers are set up in 8-bit sequential relation. A bus master and bus master control means for utilizing each of the first in-first out registers in half sections and filling each half section sequentially.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings wherein like reference numerals identify like elements throughout, and in which:

Referring to FIG. 1, the new capture method and apparatus, generally indicated at 10, incorporates the advancements in compression algorithms and the personal computer (PC) industry to provide an inexpensive means of capturing the MPEG-2 video files required for HDTV broadcast and demonstration. The HDTV program material can be downloaded to the computer system, generally indicated at 11, to the hard drive 12 several different ways, all of which will be discussed later. Regardless of the input source, once in its compressed form, the data is transferred to the computer system 11 over the PCI bus 13 to the computer's hard drive 12 for later usage. This technology will provide the user with a means for capturing MPEG-2 (moving pictures experts group) video data. The capabilities of this new technology will also increase public support of HDTV, by allowing manufacturers the ability to demonstrate their product at the present time, even where broadcast of HDTV signals is limited to nonexistent.

The new capture method and apparatus will be used in a device that will provide to the users of the device the ability for flexibility of downloading high definition television data files from any one of several sources. It will help the manufacturers of high definition televisions and receivers expose the consumer to the new technological advancements in the video industry.

Figure 1:
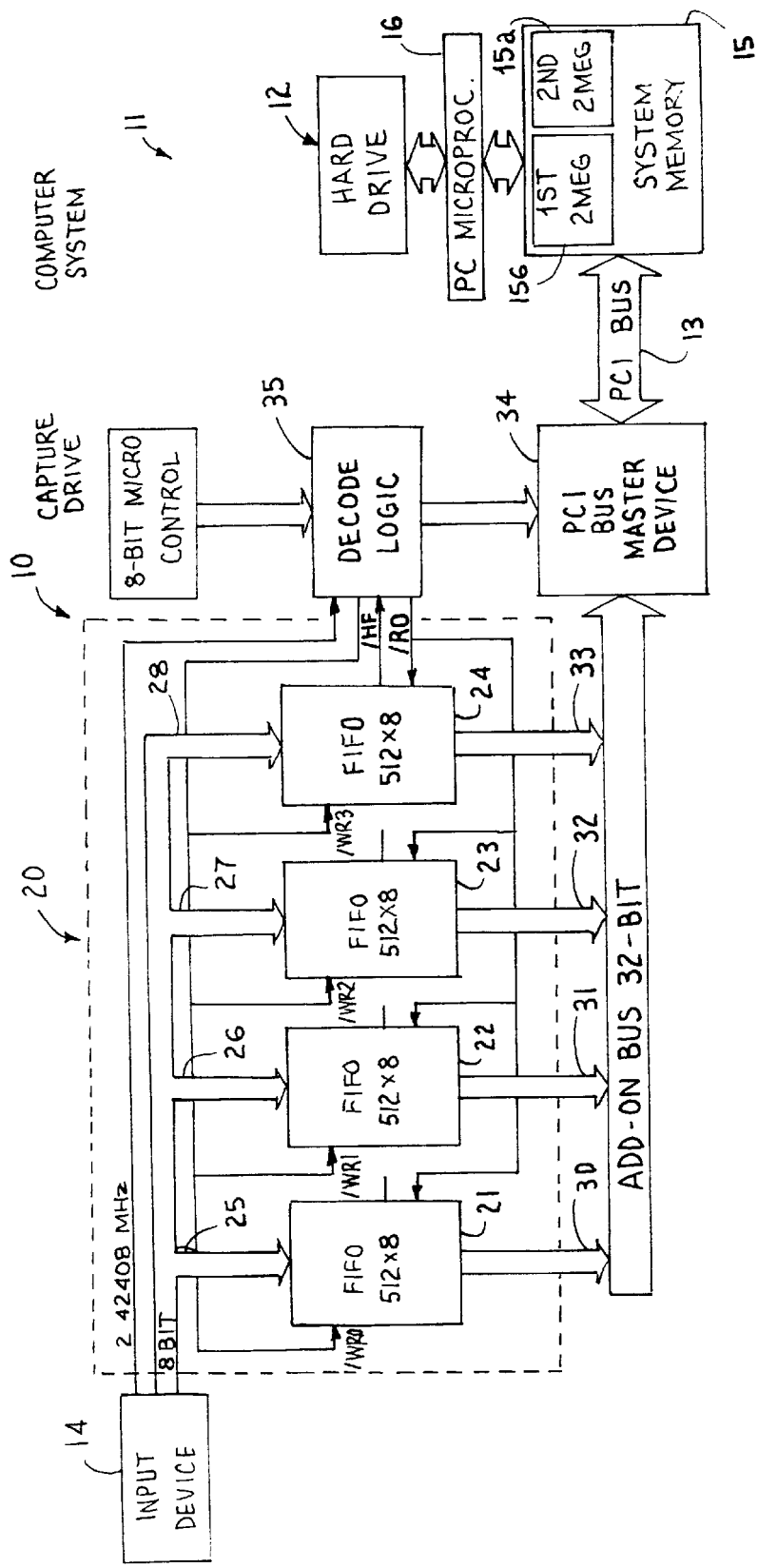
FIG. 1 is a diagrammatic view of the MPEG-2 video file capture apparatus, constructed in accordance with the present invention, for capturing MPEG-2 video file data for later use.

Referring again to FIG. 1, compressed digital video and audio information enters the system from the input device 14. This input device 14 can be from any source that provides an ATSC (advanced television standards committee) formatted transport stream. These sources can include an internal 8VSB (vestigial side band) demodulator (not shown), an internal QPSK (quadrature phase shift keying) capture card for satellite downloads (not shown), the internal DVD drive or any external device with a parallel output which supports either TTL or LVDS (low voltage differential signaling) signals.

One of the main requirements of the data capture method is to re-clock the input data from the fixed rate that is part of the parallel interface and the modulation standard. The reason for this re-clocking is because data that is presented to a hard drive 12 is not at a fixed rate. The transfer of data from the external input device 14 to system memory 15 via the PCI bus 13 is controlled by the computer's microprocessor 16 and is continually interrupted as the microprocessor 16 services other tasks and subroutines. Because of this, a buffer, generally indicated at 20, that allows data to be read at one rate (fixed) and written at another is needed. This is accomplished through the use of FIFO (first in-first out) memory 21–26, which has two separate ports: one for the input (read) data 25–28) and another for output (written) data 30–33. Using this capture scheme, there are separate clocks for each of the ports on the FIFO memory devices.

The entire re-clocking process is handled in two steps. The first is performed by the four 512-byte blocks 21–24 of FIFO memory. As we know, data in a hard drive 12 and system memory 15 are stored and manipulated in 32-bit wide data words. Because the input to this system from the input device 14 must be 8-bits wide, four 8-bit FIFOs 21–24 are used. Along with the 8-bit wide data stream from the Input Device, an input data clock is also presented to the system at a fixed rate of 2.42408 Mhz—the byte rate for the ATSC High Definition standard. The control logic receives this input data clock and divides it into four sequential 606,020 khz negative going clock pulses, represented by /WR0–/WR3 in FIG. 1. As the input device 14 supplies the 8-bit data stream and the data clock at the fixed rate, the FIFOs 21–24 are filled sequentially as the write pin (/WR) control lines are pulsed by the control logic. When the fourth FIFO 24 has been written—/WR3, the write pulse is returned to the first FIFO 21 and the entire process is repeated. Writing to the FIFOs 21–24 in this manner will continue until the input data clock from the input device 14 is halted or removed from the system.

When the input device 14 has supplied 1024 8-bit bytes (256 32-bit words), the half full pin (/HF) of the fourth FIFO 24 will pulse low. This pulse will flag the control logic 35 initiating the bus master to transfer the data from the FIFO's 21–24 to the PCI bus 13, and eventually to the system memory 15. The transfer is accomplished by pulsing the read pin (/RD) of the FIFOs 21–24 low for 256 clock pulses at the rate determined by the system PCI clock divided by two. This rate is substantially faster than the rate of the input data clock supplied by the input device 14, so the FIFOs 21–24 do not run the risk of overflowing, which would result in lost data. Since the writing and reading of the FIFOs 21–24 is asynchronous, the filling of the FIFOs 21–24 from the input device 14 is not interrupted as the data is removed and presented to the PCI bus 13 by the bus master 34. As the capture process continues, the /HF pin pulses low after each 1024 bytes (256 32-bit words) triggering the bus master 34 to repeat its operation of presenting the data to the PCI bus 13 and the system memory 15.

The second step occurs when the microprocessor moves the data into two concurrent 2 Meg blocks 15a, 15b of system memory 15. Initially one of the 2 Meg blocks 15a will be filled and then the other 15b. Similar to the function of the FIFOs, as one block 15a is being filled, the other 15b is being written to the hard drive. As the write pointer transitions into the second block 15b of system memory, the microprocessor is notified to empty the first block 15a. The "empty cycle" of the first block 15a can be completed faster than the second block 15b is filled. This cycle of emptying the full blocks continues until the system is stopped, again by the halting of the input data stream or by a control command.

The input device 14 maintains a constant flow of data to the input FIFOs 21–24 at the following rate: 19.392658 megabits per second or 2.424082 megabytes per second.

The 19.392658 megabits per second rate is the bit rate for the MPEG-2 transport stream. This is the input data rate when MPEG data is loaded into the input FIFOs 21–24. The rate at which the data is removed from the FIFO 21–24 to the PCI bus 13 and to system memory 15 can vary depending on the system. It should be noted that the system transfer must always be sustained at a rate higher than that of the input data, to guarantee no data loss.

Figure 2:
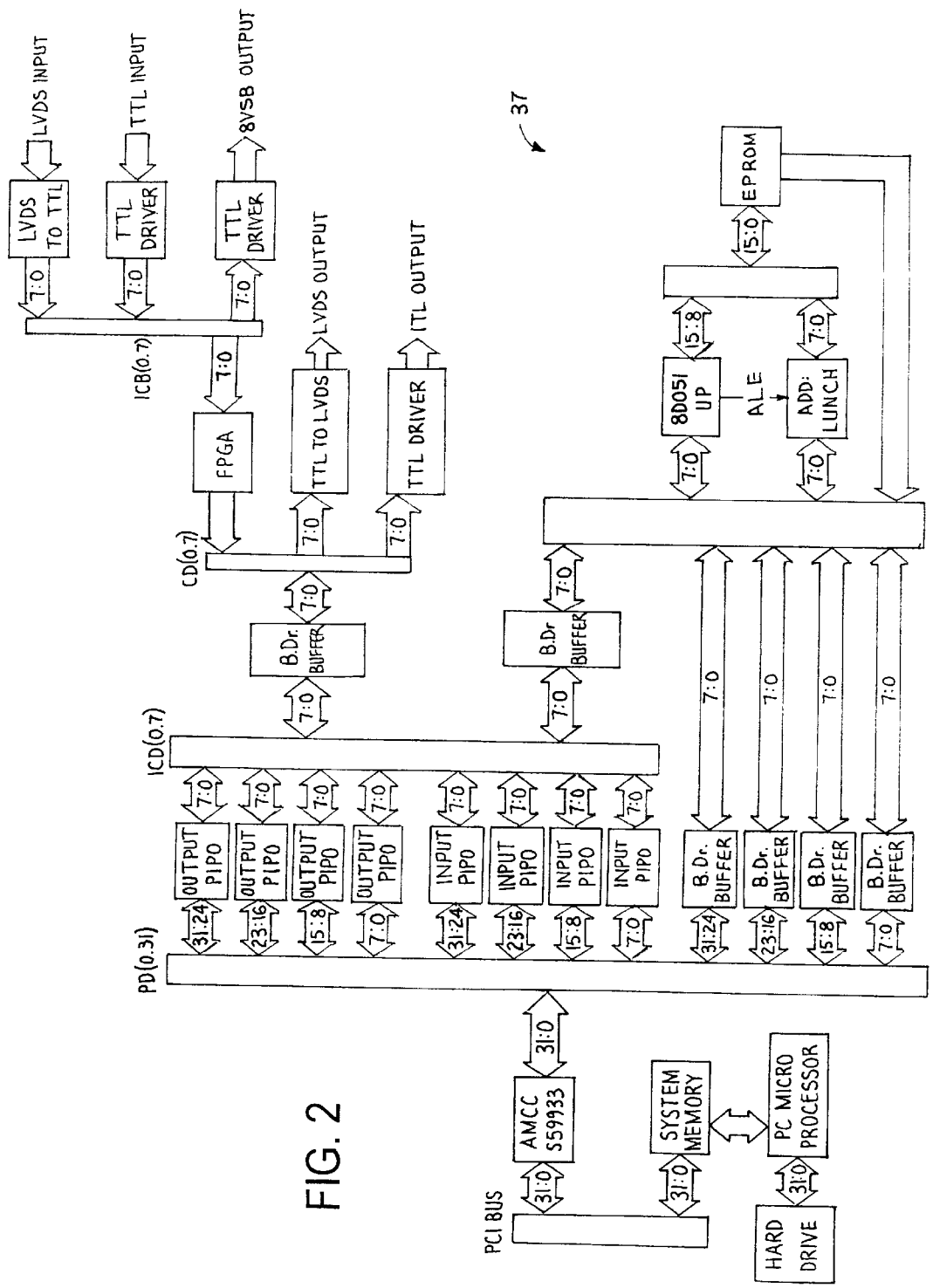
FIG. 2 is a data transfer block diagram for the embodiment of the invention shown in FIG. 1.

Referring to FIG. 2, a data transfer block diagram shows the new apparatus, generally indicated at 37. It shows a more detailed view of the transfer method used to capture a transport stream, as well as sustain a fixed output data rate necessary to generate an HDTV signal for demonstration purposes.

This transfer method provides a cost-effective means of storing and retrieving video data to and from a consumer-type hard drive and produces a fixed rate data interface for the MPEG transport stream.

While the present invention has been described herein in connection with a preferred embodiment, it will be understood by those skilled in the art that many changes and modifications may be made without departing from the true spirit and scope of the invention.

What is claimed is:

1. A method of capturing and storing digital HDTV signals comprising the steps of:

filling each of four first in-first out registers with data in an 8-bit per device sequential fashion at a constant flow rate until they are half full, transferring said data to system memory as 32 bit words, filling each of said four first in-first out registers with said data in an 8-bit per device sequential fashion at a constant flow rate in a quantity equal to half filling said first in-first out registers, transferring said data to system memory as 32 bit words, filling a first of 2 concurrent blocks of system memory with said data presented to said system memory, filling a second of 2 concurrent blocks of system memory with said data presented to said system memory, writing said data from said first of 2 concurrent blocks of system memory as said second of 2 concurrent blocks of system memory is filling, writing said data from said second of 2 concurrent blocks of system memory as said first of 2 concurrent blocks of system memory is filling, and the transfer of said 32 bit data words being accomplished at a faster rate than the input of said 8-bit data.

2. The method as called for in claim 1 wherein said constant flow rate of data into the first in-first out registers is 19.392658 megabits per second.

3. The method as called for in claim 1 wherein said constant flow rate of data into the first in-first out register is 2.424082 megabytes per second.

4. A data capturing and storage apparatus for storing 32 bit HDTV video data, said apparatus comprising:

a central processing unit, system memory in communication with said central processing unit including at least first and second distinct blocks of memory, four first in-first out registers set up in parallel relation, a bus master, and bus master control means for utilizing each of said first in-first out registers in half sections, and filling each half section sequentially.

5. The data capturing and storage apparatus as called for in claim 4 further including an input device.

6. The data capturing and storage apparatus as called for in claim 5 wherein said input device is an 8VSB demodulator.

7. The data capturing and storage apparatus as called for in claim 5 wherein said input device is a QPSK capture card for satellite downloads.

8. The data capturing and storage apparatus as called for in claim 5 wherein said input device is a DVD player.

9. The data capturing and storage apparatus as called for in claim 5 wherein said input device includes a parallel output that supports at lease one of TTL and LVDS signals.

10. The data capturing and storage apparatus as called for in claim 5 further including means for transferring data between said four first in-first out registers and said distinct blocks of system memory at a faster rate than an input of data from said inputs device to said four first in-first out registers.

11. The data capturing and storage apparatus as called for in claim 4 including means for re-clocking said data from a fixed rate standard for each input port of said sections on said four first in-first out registers.

* * * * *